2,809,991

SYNTHESIS OF ADIPIC ACID

Roger A. Hines, Wilmington, Del., assignor to E. I. du Pont de Nemours and Company, Wilmington, Del., a corporation of Delaware No Drawing. Application July 14, 1953, Serial No. 368,005

4 Claims. (Cl. 260—537)

This invention relates to a process for the synthesis of adipic acid by the interaction of thiophane with carbon monoxide and water in the presence of specific catalysts as hereinafter set forth.

It has been known for several years that adipic acid can be prepared by reaction between tetrahydrofuran and carbon monoxide in the presence of water and catalysts such as mixtures of nickel carbonyl and nickel halides.

An object of this invention is to provide a novel process for the preparation of adipic acid by the use of very cheap and readily available starting materials which have not heretofore been employed as starting materials for adipic acid synthesis. Other objects and advantages of the invention will appear hereinafter.

It has been discovered in accordance with this invention that thiophane undergoes reaction with carbon monoxide and water in the presence of nickel carbonyl to produce adipic acid. In general the nickel carbonyl is employed in combination with a promoter such as a nickel halide or other metal halide. The reaction between thiophane, carbon monoxide, and water is conducted in accordance with this invention under pressures of about 200 to 3000 atmospheres, preferably about 300 to 1200 atmospheres. The reaction temperature is generally maintained within the range of about 150° to 400° C., preferably 250 to 350° C.

The catalyst which is employed in the practice of the invention is preferably nickel tetracarbonyl having the empirical formula $Ni(CO)_4$, but other similar carbonyls such as nickel carbonyl halide, or hydrates thereof, may be employed if desired. The preferred combination of catalyst and promoter is a mixture of nickel carbonyl halide such as nickel chloride or nickel iodide. In general auxiliary catalysts, or promoters, which may be employed simultaneously with nickel carbonyl include platinum, iodine, and the metal halides, such as zinc halides, and the like.

The invention is illustrated further by means of the following example.

Example

A mixture consisting of 88 grams of thiophane, 36 grams of distilled water, 3 grams of $NiCl_2$, 3 grams iodine, and 5 grams of platinized asbestos was charged into a platinum-lined steel shaker tube which had been chilled and flushed with nitrogen. Into the shaker tube was then injected 5 grams of Ni carbonyl after which carbon monoxide was pumped into the tube and the tube was heated until the temperature was 280°–320° C. and the carbon monoxide pressure was 300–320 atmospheres. These reaction conditions were maintained for a period of about 2½ hours. The resulting product was steam distilled for the recovery of 41 grams of unreacted thiophane. The distillation residue on cooling and evaporation produced crystalline adipic acid in good yield, based on the thiophane reacted. Upon recrystallization of this adipic acid from benzene, purified adipic acid having a melting point of 147°–150° C. was obtained. Adipic acid is also obtained without having present the iodine and platinized asbestos, but the conversion is considerably lower.

It is to be understood that the example hereinabove given is illustrative only and that numerous methods may be employed for practicing the invention. For example, various methods may be used for purifying the adipic acid or converting it to distillation products through esterification, etc., if desired. The reaction between the thiophane, carbon monoxide, and water can be carried out in a continuous manner, e. g. by passing the thiophane and water through a tubular converter with concurrent or countercurrent through a flow of carbon monoxide, the rates of flow being adjusted coordinating with pressure, temperature, and catalyst to produce the desired degree of reaction. The percentage conversion of thiophane can be varied over a rather wide range and in low conversion processes it is, of course, desirable or essential to recover the unreacted thiophane and return it to the carbonylation zone.

The reaction may be conducted in vessels made of or lined with silver, platinum, copper, and the like or a refractory material such as glass, silica, porcelain, etc.

The adipic acid which is obtained in the process of this invention is highly valuable as an intermediate in the manufacture of polyamide-type or polyester-type resins.

It is to be understood that many changes may be made in the details illustrated herein without departing from the scope of the invention or sacrificing any of the advantages that may be derived therefrom.

I claim:

1. A process for the synthesis of adipic acid which comprises reacting thiophane with carbon monoxide and water in the presence of a nickel carbonyl catalyst and a nickel halide at a temperature within the range of 150° to 400° C. under a pressure of 200–3000 atmospheres and thereafter separating adipic acid from the resulting mixture.

2. A process for the synthesis of adipic acid which comprises reacting thiophane with carbon monoxide and water in the presence of a nickel carbonyl catalyst and nickel chloride at a temperature within the range of 150° to 400° C. under a pressure of from 300 atmospheres to 1200 atmospheres and thereafter separating adipic acid from the resulting mixture.

3. A process for the synthesis of adipic acid which comprises heating thiophane with water and carbon monoxide in the presence of nickel carbonyl, nickel chloride, platinized asbestos and iodine at a temperature within the range of 250°–350° C. under a pressure within the range 300 to 1200 atmospheres and thereafter separating adipic acid from the resulting mixture.

4. The process of claim 3 wherein the temperature is 280–320° C. and the pressure is 300–320 atmospheres.

References Cited in the file of this patent

UNITED STATES PATENTS

| | | |
|---|---|---|
| 2,432,474 | Gresham | Dec. 9, 1947 |
| 2,670,370 | Toland | Feb. 23, 1954 |

OTHER REFERENCES

Groggins: Unit Processes and Organic Synthesis (1952), p. 594.